United States Patent [19]

Crandall et al.

[11] 4,162,334

[45] Jul. 24, 1979

[54] METHOD FOR BAKING IN TERRA SIGILLATA COATED PAN

[75] Inventors: William B. Crandall, Alfred Station; Linda J. Wasserstein, Rockville Centre, both of N.Y.

[73] Assignee: Alfred University Research Foundation Inc., Alfred, N.Y.

[21] Appl. No.: 935,663

[22] Filed: Aug. 21, 1978

Related U.S. Application Data

[62] Division of Ser. No. 791,507, Apr. 27, 1977.

[51] Int. Cl.² ............................................. A21D 8/06
[52] U.S. Cl. .................................... 426/505; 220/458; 426/523
[58] Field of Search ......... 99/324, 426, 432, DIG. 15, 99/450; 220/458; 126/390; 426/505, 523; 428/35, 454

[56] References Cited

U.S. PATENT DOCUMENTS

| | | | |
|---|---|---|---|
| 151,246 | 5/1874 | Schreiber | 220/70 X |
| 1,663,660 | 3/1928 | Hottinger | 428/454 X |
| 1,814,870 | 7/1931 | Tycer | 220/458 |
| 3,202,542 | 8/1965 | Roje | 220/458 |
| 3,523,817 | 8/1970 | Reiss | 220/456 |
| 3,539,387 | 11/1970 | Kelly et al. | 428/454 |
| 3,780,642 | 12/1973 | Bay | 99/347 |
| 3,854,023 | 12/1974 | Levinson | 426/107 |

OTHER PUBLICATIONS

Science & Archaeology, No. 12 (1974), pp. 21-31.

Primary Examiner—Steven L. Weinstein
Attorney, Agent, or Firm—Schovee & Boston

[57] ABSTRACT

A method for baking bread in a sigillata coated ceramic cookware vessels, such as bread pans. Bread baked in such pans has the taste and physical qualities of bread baked in a brick oven. In addition, the baked bread releases easily from the pan.

9 Claims, 2 Drawing Figures

METHOD FOR BAKING IN TERRA SIGILLATA COATED PAN

This is a division of application Ser. No. 791,507, filed Apr. 27, 1977.

BACKGROUND OF THE INVENTION

1. Field of the Invention

This invention relates to ceramic cookware and particularly to earthenware or brickware pans used for baking baked goods such as breads.

2. Description of the Prior Art

Bread baked in brick ovens has certain appetizing characteristics and physical qualities. The home baker generally bakes bread in glass or metal pans. To achieve qualities similar to those of brick oven baked bread, home economists often advise lining an ordinary household oven with clay tiles or ordinary bricks and to bake the dough directly on the tile or brick surface without the use of a glass or metal pan. Such practice has many inconveniences, such as those of handling and storing the bricks as well as wasting much heat energy to heat the bricks in order to bake the dough.

Earthenware baking or cooking vessels made of unglazed or of glazed ceramics are known and have been used in baking breads. However, the surface of unglazed, or bisque, ceramicware is often quite porous and bread baked in such ware tends to stick to the walls of the vessel making it difficult to remove. In the case of glazed ceramicware, the glazed surface does not provide the baked bread product with the taste qualities of brick oven surface baked bread.

SUMMARY OF THE INVENTION

This invention relates to novel ceramic cookware, particularly to novel earthenware or brickware baking pans. In particular, the novel ceramic cookware comprises a body of fired ceramic composition and a coating of fired terra sigillata on the cooking surfaces thereof. The ceramic composition preferably is a brick clay composition. The terra sigillata coated brick cookware of the present invention is especially advantageous for baking breads. Bread baked in a terra sigillata coated brick breadpan has been found to have the taste characteristics and physical qualities of bread baked on a hot brick surface in a brick oven. The bread has been found to be more moist and to stay fresh for a longer period of time than bread baked from the same dough in metal or glass bread pans. Additionally, the baked bread is found to release easily from the pan. The novel cookware of this invention can be used for cooking as well as baking purposes.

BRIEF DESCRIPTION OF THE DRAWING

The present invention will be more fully understood by reference to the following detailed description thereof, when read in conjunction with the attached drawing, wherein like reference numerals refer to like elements and wherein.

DESCRIPTION OF THE PREFERRED EMBODIMENTS

Figure 1:
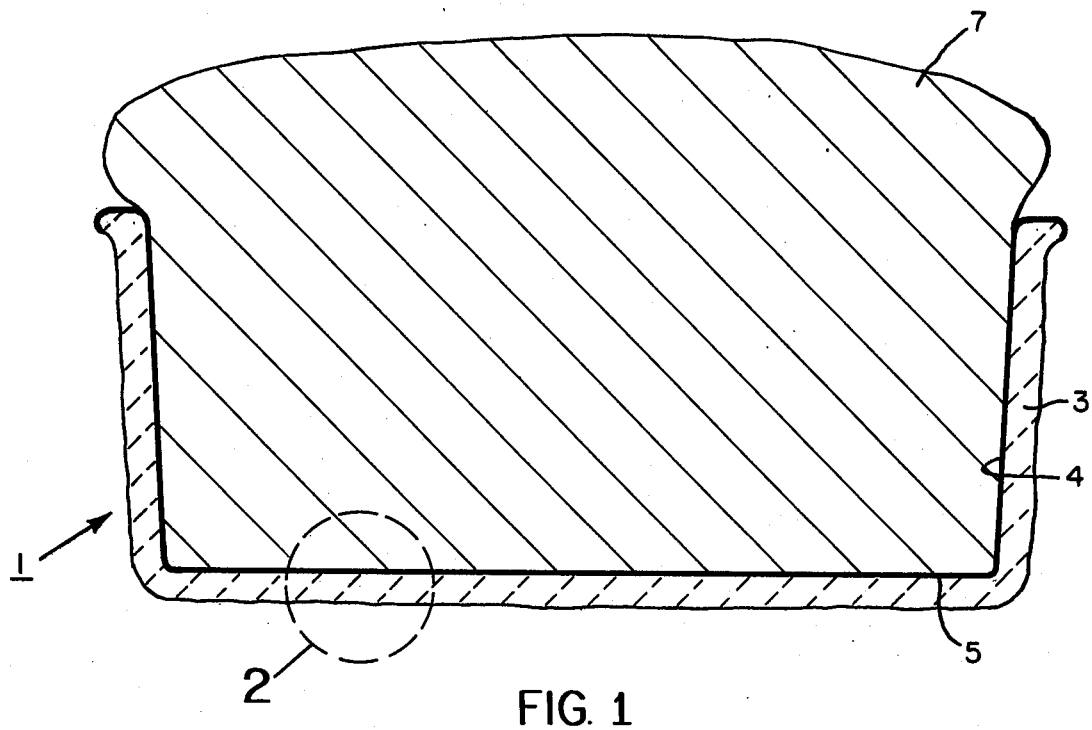
FIG. 1 is a cross-sectional view of a brickware bread pan of this invention.

With reference now to the drawing, FIG. 1 illustrates a cross-section of a brickware bread pan 1 of this invention containing a loaf 7 of baked bread. The bread pan 1 comprises a brickware body 3 and a terra sigillata coating 4 on at least the baking surfaces 5 of the body 3.

Figure 2:
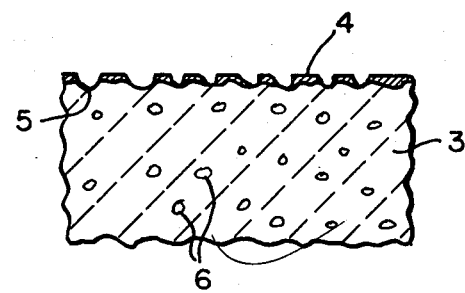
FIG. 2 is an enlarged cross-sectional view of the encircled part 2 of the terra sigillata coated surface of the bread pan of FIG. 1.

FIG. 2 shows a section 2 of the brickware body 3 greatly enlarged and shows a layer of flat particles forming the terra sigillata coating 4 on the surface 5 of the brickware body 3. The terra sigillata coating 4 covers a portion of the open pores 6 on the surface, such as 30–95% thereof and preferably 50% of the pores 6. Usually the terra sigillata closes only about 30% to 60% of the pores of the body. While the inventors hereof do not intend to be bound by any theory, they believe that the terra sigillata coating 4 provides non-stick characteristics partly because of the flat nature of the particles and partly because a portion of the open pores (but not all) are closed. Preferably, the surface is still at least about 10% porous. This feature permits the brickware body 3 to impart the taste and physical qualities of brick oven baked bread in the bread pan 1 while rendering the surfaces 5 free from sticking propensities toward the bread.

The brickware body 3 of the ceramic cookware of this invention may be made from any of the well-known fire clays and common brick clays used to make earthenware cookware. Chemical compositions of such clays, as well as their compositions in terms of clay/shale minerals, are well known. Typically, such clays consist of hydrous aluminum silicates, containing more or less foreign matter such as ferric oxide ($Fe_2O_3$) which contributes the reddish color frequently associated with clay, silica ($SiO_2$) as sand, and calcium carbonate ($CaCO_3$) as limestone. Shales are fine-grained compacted rocks whose original constituents were clays or muds. The chemical composition of shales used to practice this invention therefore is similar to that of the fire and brick clays described above.

A preferred ceramic raw material for making the body of the ceramic cookware is a clay/shale mineral composition found in the State of New York and known as Alfred shale. Alfred Shale has a mineral analysis about as shown in Table 1.

TABLE 1

| Mineral | % by Weight |
|---|---|
| Illite | 30+ |
| Muscovite | 5–30 |
| Others, as | |
| Quartz | |
| Chlorite | |
| Feldspar | |
| Biotite | |
| Rutile | |
| Organic material | 40–65 |
| | 100% |

Alfred shale has the following typical chemical analysis:

| Alfred Shale Composition | |
|---|---|
| Ingredient | % by Weight |
| $SiO_2$ | 61.2 |
| $Al_2O_3$ | 19.6 |
| $Fe_2O_3$ | 7.4 |
| MgO | 1.3 |

-continued

| Alfred Shale Composition | |
|---|---|
| Ingredient | % by Weight |
| CaO | 0.4 |
| TiO$_2$ | 1.0 |
| Na$_2$O | 1.4 |
| K$_2$O | 3.7 |
| Loss on ignition | 4.01 |
| | 100% |

The Alfred Shale for use in practice of the invention is available in pulverized form. It is screened to provide a dry clay/mineral composition having an average particle size distribution about as shown in Table 2.

TABLE 2

| Ingredient | U.S. Sieve Size | % by Weight retained on |
|---|---|---|
| Alfred Shale | 12 | 0.12 |
| Alfred Shale | 16 | 0.36 |
| Alfred Shale | 20 | 2.3 |
| Alfred Shale | 30 | 5.2 |
| Alfred Shale | 40 | 8.9 |
| Alfred Shale | 50 | 10.5 |
| Alfred Shale | 70 | 9.4 |
| Alfred Shale | 100 | 7.6 |
| Alfred Shale | 140 | 7.6 |
| Alfred Shale | 200 | 14.0 |
| Alfed Shale | 270 | 11.5 |
| Alfred Shale | 400 | 11.0 |
| Alfred Shale | −400 | 11.5 |
| | | 100.0% |

The sized clay/mineral composition is mixed with other usual ingredients advantageous for forming a green clay ceramic cookware body with porosity similar to that of other ceramic bodies.

A typical composition for forming the green brickware body 3 has the following formulation:

| Ingredient | % by Weight |
|---|---|
| Alfred Shale (ground) | 80–82 |
| Water | 18–20 |

The composition is formed with a green, i.e. unbaked, molding clay in a usual way and the molding clay is shaped into the shape of a desired cooking vessel such as a baking pan. For example, a bread pan such as that shown in FIG. 1 desirably has dimensions of 4" wide×8" long×2¼" deep. The size is not critical. A wall thickness of about 3/16" to ¼" is preferably used.

The green molded vessels or pans are fired in a known way at firing temperatures ranging from about pyrometric cone 08 (950°) to about cone 2 (1160° C.) (rapidly heated at 150° C./hr.). Firing temperatures of about cone 06 (1015° C.) to about cone 02 (1125° C.) are preferably used. At the lower firing temperature of 950° C., a shrinkage of about 2% of the body dimensions occurs; at the other extreme, at a firing temperature of 1160° C., a shrinkage of about 7% occurs. In the preferred firing temperature range, the shrinkage is about 4 to 6%. Water absorption or permeability to gases or water of the fired bodies vary inversely to the firing temperature and range from about 12% water permeability, based on the dry weight of the body, at 950° C. to about 2% at 1160° C. Bodies fired at 1000° C. to 1120° C. (the preferred firing temperature range), have a water permeability of from about 8 to 10%. The degree of permeability can be advantageously controlled by use of the terra sigillata coating of this invention as further described herein.

The fired brickware body 3 can be used to bake bread having the taste and physical qualities of oven baked bread. However, the porous surfaces 5 of the brickware body 3 should cause the baked bread to stick somewhat to the surfaces 5. It has been found that the tendency of the bread to stick can be overcome by applying to the brickware body 3 a terra sigillata coating 4 as described below.

Terra sigillata is a fine clay-like surface placed upon a ceramic body which can be heated (fired) to produce a satin-like surface on a finished product. For further information regarding the nature of terra sigillata materials and preparation, one should consult "The Surface Finish of Samian Ware" by J. D. Bestwick and T. S. Smith, *Science and Archaeology* no. 12 (1974), pages 21–31.

In general, terra sigillata coating composition is a dilute suspension of defloculated particles of finely-divided clay particles obtained by dispersing a selected clay in water in the presence of a dispersing agent. Preferably, the clay used is the same clay as that used in the body of the vessel to be coated. In the present invention, the terra sigillata preferably is prepared from Alfred Shale. The dispersing agent can be any of the defloculating agents used in the art. Preferably, the dispersing agent is a sodium phosphate such as Calgon (tradename for sodium phosphate containing approximately 67% P$_2$O$_5$).

Terra sigillata coating composition used to make the terra sigillata coating 4 of the present invention preferably has the following initial formulation:

| Terra Sigillata Coating Composition, Initial | |
|---|---|
| Ingredients | % by Weight |
| Alfred Shale (ground) | 20 to 40 |
| Dispersing Agent (Calgon*) | 0.01 to 1.0 |
| Water | 60–80 |

*Trademark

The Alfred Shale mixture shown above, for use in the coating composition of the invention, is ball milled for 24 hours, put in a tank and allowed to settle for 24 hours, and then the light colored top suspension is decanted. The particle size distribution is all below 2 μm.

In a preferred embodiment the terra sigillata coating composition is formulated to make a final coating composition having the following ingredients in percent by weight:

| Terra Sigillata Coating Composition, Preferred | |
|---|---|
| Ingredients | % by Weight |
| Alfred Shale (ground) | 25.0 |
| Dispersing Agent (Calgon) | 0.5 |
| Water | 74.5 |

The terra sigillata coating composition is applied to the dried brickware body 3 while the body is at room temperature. The body plus the terra sigillata coating 4 is preferably fired at one time, but multiple firings can be used. There is some memory or (a relic) of the small flat clay-like particles remaining after firing.

The layer of particles range from about 5 to 15 microns in thickness after firing. Preferably, the layer of particles will have a fired thickness of from 8 to 10 microns. Layers of particles of a desired thickness are readily obtained by spraying a coating composition of terra sigillata onto the body surfaces 5 of the brickware body 3 at a coverage from 0.3 to 0.9 mg/cm$^2$, dry basis, and preferably at a coverage of about 0.6 mg/cm$^2$.

The clay-like particles best suited for the terra sigillata coating of this invention usually includes a high percentage of illite particles, although other clay-like particles like kalonite will also be useful.

The particle size of the separated minerals is usually less than three microns. A few larger particles, if present, will tend to reduce the effect of the finer particles as they lay flat on the surface of the clay body. The dispersed suspension of the particles has a low specific gravity.

A fluid spray of this low specific gravity mass (1.13 gm/cc) allows the clay-like particles to flow easily as they strike the surface of the clay body and permit them to lay down on their flat "plate-like" surfaces.

When the cookware item is fired (heated) to the temperature described, the clay-like particles go through structural changes (macroscopically and microscopically) which destroy the original mineral form. However, there seems to be a "memory" for original clay-like particles, the amount of this memory depending upon the firing (heating), procedure (rate) and final temperature. A better understanding of this transformation process can be obtained by studying the D.T.A. (Differential Thermal Analysis) of this firing process. (Example in "Ceramic Science for the Potter" by W. G. Lawrence, page 57, published by Chilton Book Company, 1972).

When the cookware item is prepared from the Alfred Shale body and Alfred Shale Terra Sigillata, as described herein and heated to the temperatures described, the resulting product has a satin-like surface over a porous body. The physical and mechanical properties thus derived impart strength and durability in the body and a proper amount of exposed pores, so that cooking oils and water may penetrate the cookware in a controlled fashion, while eliminating possible sticking of the food inside through the property of the terra sigillata surface.

The terra sigillata surfaces described herein impart beneficial properties to the food as described later.

EXAMPLE

Terra sigillata coated brickware bread pans 1 have a terra sigillata coating made according to the preferred embodiment of this invention were used to bake bread in comparison tests with breads baked in glass bread pans and in metal bread pans of the same dimensions.

A bread dough for use in the comparison tests was made using the following recipe:

| Bread Dough Recipe | |
|---|---|
| Ingredients | Measure |
| Active Dry Yeast | 1 pkg. |
| Warm Water (110°–115°) | ¼ cup |
| Warm Milk (110°–115°) | 2 cups |
| Butter, Melted | 3 Tbsp. |
| Salt | 1 Tbsp. |
| Honey | 3 Tbsp. |
| Flour | 6–6½ cups |

(to be put in the pan herein described)
1. In a large bowl dissolve yeast in water. Let stand 5 minutes.
2. Stir in warm milk and add melted butter, salt and honey. Beat for one minute.
3. Stir in 3 cups of flour, 1 cup at a time. Beat for 2 minutes.
4. Add 4th cup and beat until smooth.
5. Add 5th cup, and 6th.
6. Turn dough out onto a liberally floured board. Knead 8–10 minutes.
7. Place in greased bowl—turn to grease all sides.
8. Let rise, covered, for 1–1½ hours.
9. Punch down and knead on floured surface for one-two minutes. Divide dough and shape into 2 loaves. Roll each piece into 8"×10" rectangle, starting from 8" side roll up jelly roll style and place in greased pans.
10. Cover and let rise about one hour or until dough rises above the edge of the pan.
11. Preheat oven to 350° and bake for 30–45 minutes. Remove breads and cool on racks.

Each of the terra sigillata coated brickware pans was given a pretreatment before it was used to bake the bread. The pretreatment consisted of wiping the surfaces of the terra sigillata 4 with a light layer of corn oil and heating the pan to about 125° C. (257° F.) for one hour. The treated pans 1 then were used in comparison with glass bread pans and metal pans.

Each of the pans used in the comparison test was greased with a vegetable oil before dough was placed in the pans. Equal portions of the dough were placed in each pan. After the dough had raised, the pans were placed in a preheated oven maintained at about 375° F. (190° C.) and the baking of the dough to bread was carried out for about 45 minutes. The baked bread were then removed from each pan and compared for various taste and physical characteristics. The results obtained are tabulated in Table 4.

TABLE 4

Comparison of taste and physical qualities of bread baked in terra sigillata coated brickware pan 1 versus glass and metal pans:

| Quality or Characteristic of Bread | Results Using Terra Sigillata Coated Bread Pan as compared to glass and Metal Bread Pans |
|---|---|
| 1. Rising Rate | Rises faster |
| 2. Baking rate | Bakes faster |
| 3. Crust color | Darker |
| 4. Moisture Content | Higher |
| 5. Texture | Finer |
| 6. Pore Structure | Even |
| 7. Aroma | Stronger |
| 8. Baking uniformity | More uniform |
| 9. Taste | Better |
| 10. Slicing | Slices well warm or cold |
| 11. Releasability from pan | Easy |
| 12. Washability of pan | Easy |

It is to be understood that the foregoing description of the preferred embodiments of this invention are illustrative only and that changes can be made in the compositions and proportions hereof without departing from the scope of the invention as defined in the following claims. For example, the terra sigillata coating can, if more convenient, cover the entire bread pan or other vessel rather than just the cooking surfaces. Also, while it preferably is a single sprayed-on layer, it could be a plurality of layers as long as the desired porosity was retained. What is claimed is:

1. A method for baking bread having taste and physical characteristics of brick oven baked bread, said method comprising baking bread dough in a bread pan comprising a porous fired brickware body having a water permeability of at least about 2% and having at least its baking surfaces coated with a fired terra sigillata coating, said coating closing only a portion of the pores of said surfaces of said body such that the brickware body imparts the taste and physical qualities of brick oven baked bread to the bread in the bread pan while rendering said surfaces free from sticking propensities toward the baked bread.

2. The method according to claim 1 wherein the terra sigillata coating is obtained by firing a terra sigillata coating composition having approximately the following formulation:

| Ingredient | % by Weight |
| --- | --- |
| Alfred Shale (ground) | 20 to 40 |
| Dispersing agent | 0.01 to 1.0 |
| Water | 60 to 80 |

3. The method according to claim 2 wherein the dispersing agent is sodium phosphate having approximately 67% $P_2O_5$.

4. The method according to claim 2 wherein said fired brickware body has a water permeability of from about 2% to 12%.

5. The method according to claim 1 wherein said coating closes only about 30% to 60% of said pores.

6. The method according to claim 1 wherein said coating closes only about 30% to 95% of said pores.

7. The method according to claim 1 or 2 wherein said fired brickware body comprises Alfred shale.

8. The method according to claim 1 wherein said terra sigillata coating has a thickness of from about 5 to 15 microns.

9. The method according to claim 1 wherein said terra sigillata coating has a thickness of from 8 to 10 microns.

* * * * *